United States Patent

Fox

[11] 3,849,926
[45] Nov. 26, 1974

[54] DIP NET

[76] Inventor: Sam Fox, 630 N. Pulaski St., Baltimore, Md. 21217

[22] Filed: July 6, 1973

[21] Appl. No.: 377,025

[52] U.S. Cl. ................................. 43/11, 403/376
[51] Int. Cl. ............................................ A01k 77/00
[58] Field of Search .......... 43/11, 12; 403/345, 376, 403/377

[56] References Cited
UNITED STATES PATENTS

| | | | |
|---|---|---|---|
| 2,293,800 | 8/1942 | Brown | 43/12 UX |
| 2,595,597 | 5/1952 | Morseth | 43/11 X |
| 2,741,053 | 4/1956 | Moore | 43/11 |

*Primary Examiner*—Robert Peshock
*Assistant Examiner*—Daniel J. Leach

[57] ABSTRACT

A rigid hoop is held in fixed position in a tubular handle by means of a solid plug which is tightly fitted into the end of the handle and which has parallel channels extending from the end of the plug inwardly along opposite sides and a cross-bore joining the channels, all of which is adapted to receive a pair of arms extending outwardly from the periphery of the hoop and terminating in inwardly turned portions inserted in opposite ends of the cross-bore. This is a particularly good construction for making dip nets for use in crabbing or fishing where a handle is made of light weight tubular aluminum and the hoop is formed of a steel rod.

5 Claims, 4 Drawing Figures

PATENTED NOV 26 1974  3,849,926

DIP NET

DESCRIPTION

This invention relates to a novel assembly of a tubular handle and a relatively rigid hoop attached to one end thereof such as is used in dip nets for fishing or crabbing.

In my U.S. Pat. No. 2,684,320 issued Dec. 29, 1953, I have described a novel method of joining a handle to a hoop carrying a net for use in landing fish. That invention provides a novel means for attaching the hoop to a wooden handle and holding it there against easy withdrawal.

Recently, wooden handles have become more and more scarce and consequently more expensive, which dictates against their use for relatively inexpensive items such as dip nets, particularly those which are used by casual fishermen who are not willing to pay for more expensive equipment. It is now more practical to use extruded aluminum handles, which are low in price and are relatively light in weight. However, with light weight tubular metal, it is difficult to secure or anchor a net carrying hoop. Various techniques have been used including crimping the end of the handle around the outwardly extending parallel ends of the hoop-forming member to give a relatively tight fit. However, this is not entirely satisfactory because, with constant use, the connection works loose.

I have discovered that it is possible to attach a metal hoop to a tubular aluminum handle by means of a solid plug of wood or suitable plastic material which is tightly fitted into the end of the handle and which has parallel channels extending along opposite sides and to a crossbore. The hoop is provided with parallel radially outwardly extending arms which are adapted to be inserted in the parallel channels and which have their ends turned inwardly to fit into the crossbore connecting these channels. The arms and parallel channels are sized so that a tight fit between them is achieved. This gives a relatively rigid almost unitary construction. By driving a pin or nail through the wall of the tubular handle, the unit is held in fixed position. This provides a relatively inexpensive structure which can be used by the casual fisherman who is not willing to invest large sums of money in equipment but who still needs a fool proof unit. The usual net is laced to the metal hoop.

My invention is more fully explained by reference to the accompanying drawings in which.

Figure 1:
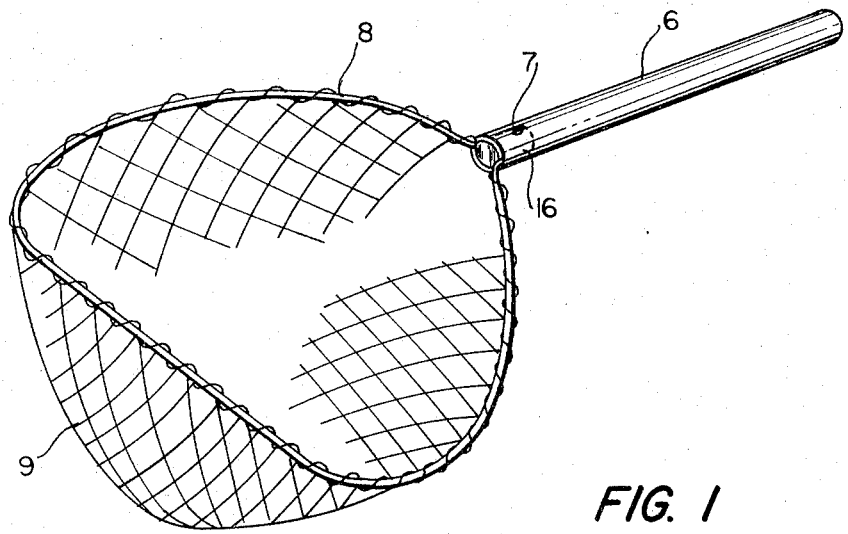
FIG. 1 is a crab net assembly.
Figure 2:
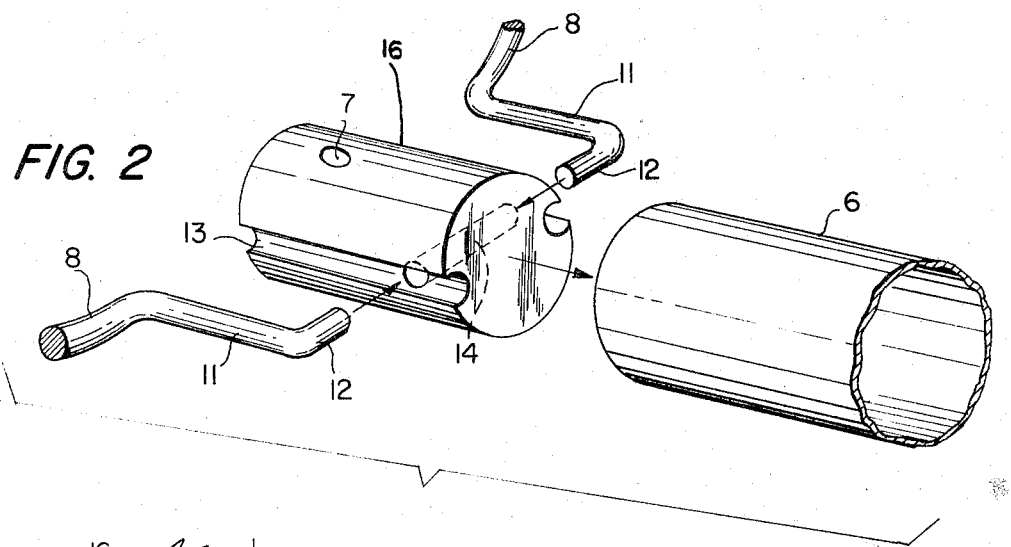
FIG. 2 is an exploded fragmentary view showing the novel feature of my invention.
Figure 3:
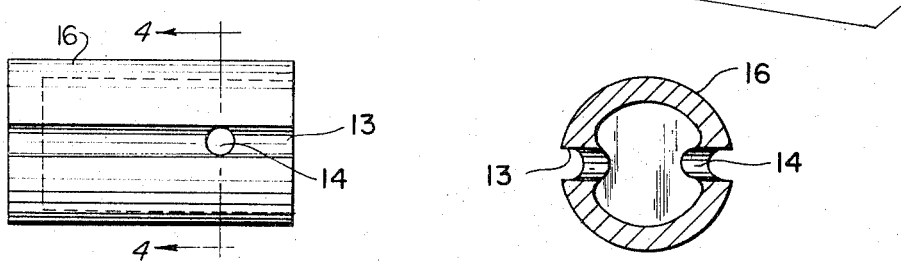
FIG. 3 is a side view of a hollow plug for anchoring the net hoop to the tubular handle.
Figure 4:
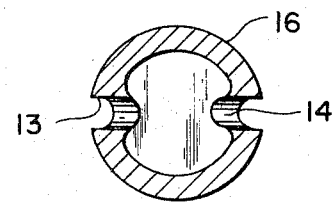
FIG. 4 is a cross sectional view of the plug in FIG. 3 taken along lines 4—4.

My invention consists of a tubular handle 6, which is preferably aluminum although any other lightweight rigid metal or plastic may be used. Into one end of this handle is inserted an anchor plug 16 which holds loop 8 bearing net 9 in fixed position in handle 6. The construction details are more clearly illustrated in FIGS. 2, 3, and 4 wherein hoop member 8 is formed preferably as a rod bent to form a circle and having its ends turned radially outward to form parallel arms 11 with their terminal portions being turned inwardly to form a pair of jaws 12. Plug 16 may be solid but if it is of plastic, it may be hollow, as shown in FIGS. 3 and 4 to facilitate molding, and to reduce weight and quantity of polymer. The usual polymeric materials which are not brittle may be substituted for wood. The plug 7 is of such size that it must be driven into the open end of tubular handle 6 so that it forms a very tight fit to prevent ready withdrawal. Formed along opposite sides of plug 16 are channels 13 adapted to receive parallel arms 11 snugly and having a cross-bore 14 extending through the plug and connecting the channels on opposite sides. This cross-bore is of such size that the jaws 12 are received therein. When assembled, the plug may be held in place by means of a pin or nail 7 to give a relatively rigid unitary construction to the device.

For simplicity, it is preferred to make the hoop 8 of a single metal rod which is bent to form desired shape with the end portions being bent outwardly to form the arms 11 and the tips of the ends being bent inwardly toward each other to form the jaws 12. However, it is within the purview of my invention to have a complete ring with the arms being affixed thereto in a suitable manner, as by welding or by rivets or bolts.

Plug 16 is preferably of hard wood which does not change dimension appreciably on wetting and drying, otherwise it is likely to become loose in the handle. It should be of such size that it fits tightly in the handle even to the point of having to be power driven into place. For ease in assembly a portion of plug 16 adjacent the end to be inserted first into the handle 6 may be given a slight taper. In fact, the entire plug may be slightly tapered towards that end if the handle is of malleable material such as aluminum or steel or other metal that will be slightly expanded on insertion of the plug. In this case, the plug should be slightly larger throughout a major portion of its length than the inside of the handle so that, on assembly, there results a swaged fit.

It is not necessary that the counterbore 14 go entirely through the plug. Instead a hole may be drilled from each side to a depth sufficient to receive the jaws.

Channels 13 may be formed along the entire length of the plug 16 or only to the jaw-receiving cross-bore 14 or holes.

Plug 16 may be held in place by means of a pin 7 driven through handle 6 into the plug. Alternatively an adhesive or fluid resin may be used to insure a tight fit and to prevent water from getting into the handle. If the handle is of rigid plastic such as the so-called fiberglass materials or polyvinyl chloride, an adhesive is especially desirable for holding plug 16 in place.

By closing both ends of the handle 6, the unit may have sufficient buoyancy that it will float if accidentally dropped into the water.

In a typical structure, the handle will be of tubular aluminum, the plug of wood and the hoop of steel. Other obvious equivalents may be employed and are entirely within the purview of the present invention, the scope of which is defined by the appended claims.

I claim:

1. Means for attaching a relatively rigid hoop to a tubular handle comprising, in combination, a tightly fitting plug inserted into one end of said handle, a pair of parallel channels running along opposite sides of said plug, a crossbore connecting said channels intermediate the ends of said plug, a hoop having a pair of parallel arms extending radially outward from said hoop along the channels in said plug and having their terminal portions turned inwardly into opposite ends of said crossbore whereby said hoop and handle are held in relatively rigid association.

2. A dip net comprising in combination a tubular handle, a plug sunugly fitted into the end of said handle having a pair of parallel channels extending from the exposed end of said plug along opposite sides and terminating in a crossbore connecting said channels adjacent their inner ends, a relatively rigid hoop having a pair of parallel arms extending generally radially outward from said hoop for the length of the channels in said plug and having their ends turned inwardly into the ends of said crossbore to form anchoring jaws and a net laced to said hoop, whereby said hoop and net are rigidly held in association with said tubular handle.

3. The invention of claim 2 wherein said plug is wooden and said handle is lightweight metal.

4. The invention of claim 2 wherein the handle and plug are held in operating association by a pin driven inwardly into said plug through said handle.

5. The invention of claim 2 wherein the hoop is a metal rod bent to form a circle and the ends are turned radially outward to form the parallel arms with the terminal portions being turned inwardly to form the anchoring jaws.

* * * * *